United States Patent [19]

Dorph

[11] 4,076,185
[45] Feb. 28, 1978

[54] DUPLEX SPOOL FOR AN OPEN FACE SPINNING REEL

[75] Inventor: Thor Dorph, San Francisco, Calif.

[73] Assignees: Bjorn Lie; Gina Lie, both of Oslo, Norway; part interest to each

[21] Appl. No.: 677,714

[22] Filed: Apr. 16, 1976

[51] Int. Cl.² .................... B65H 75/14; A01K 89/00
[52] U.S. Cl. .......................... 242/118.41; 242/84.1 L
[58] Field of Search ........... 242/118.41, 118.4, 84.1 L, 242/84.1 M, 84.5 A, 84.51 A, 84.2 R, 84.2 A

[56] References Cited

U.S. PATENT DOCUMENTS

| | | | |
|---|---|---|---|
| 2,561,801 | 7/1951 | King | 242/118.4 |
| 3,602,453 | 8/1971 | Holmes | 242/84.2 A |

*Primary Examiner*—George F. Mautz
*Attorney, Agent, or Firm*—Kemon & Estabrook

[57] ABSTRACT

A conventional open-face spinning reel is modified by attaching to the outer face of the spool a second spool smaller in diameter and arranged concentrically with and having its rear face abutting the front face of the main spool.

2 Claims, 2 Drawing Figures

DUPLEX SPOOL FOR AN OPEN FACE SPINNING REEL

BACKGROUND OF THE INVENTION AND PRIOR ART

In casting with the well known open face type spinning reels, and particularly where a leader is fastened to the end of the line by a knot, it often happens that with the line fully retracted preparatory to making a cast that the presence of the knot on the surface of the outermost layer of line on the spool tends to snag some of the adjacent turns and otherwise interfere with the line smoothly coming off the reel when the cast is made. A similar problem exists irrespective of presence or absence of a knot between the end of the line and the leader when attempting to cast a maximum distance because the increased tension created during the initial portions of the casting procedure tend to bury the outermost turns of the line into the underlying turns on the spool. At the present time fishermen and particularly tournament casters will carefully hand wind the last few turns onto the spool before making a cast in order to position the last few turns at the most desirable location on the surface of the line wound on the spool.

There is no prior art known to the inventor which is directed to this problem. U.S. Pat. No. 2,535,746 discloses a multispool structure, the axis of which is shifted 90° between casting and winding operations. In use, however, the initial turns are wound on the smallest spool and the final turns on the largest spool which is the reverse of the present system.

BRIEF SUMMARY OF THE INVENTION

In order to alleviate the above problems, the present invention provides a duplex spool arrangement in which an auxiliary spool of smaller diameter than the main spool is secured to the outer face thereof and coaxially therewith. This outer spool can then be used to store the last few turns of line free of any contact with the main body of line on the main spool and thus permit smoother and more trouble-free casting.

DETAILED DESCRIPTION

Figure 1:
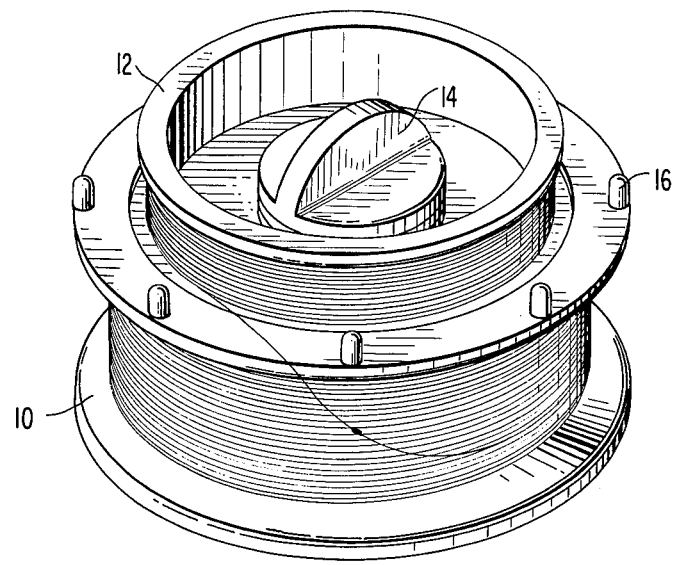
FIG. 1 is a perspective view of a spool modified in accordance with the present invention.
Figure 2:
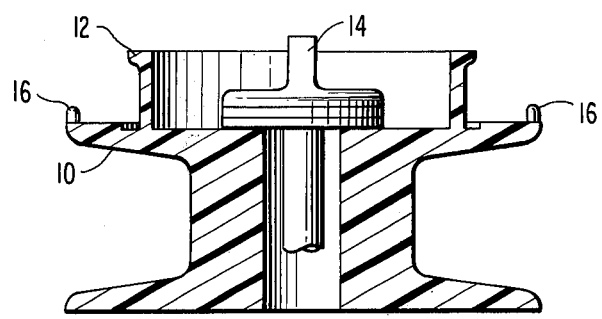
FIG. 2 is a sectional view of the modified spool shown in FIG. 1.

Referring now to the drawings for a detailed description of the present invention, the main spool which is identified by the reference numeral 10, may be any conventional spool of the type which are now widely sold on the U.S. market. The auxiliary spool identified by the reference numeral 12, is concentrically arranged with respect to the spool 10 and in abutting relationship therewith as shown. The spools may either be integrally formed or they may be joined by any appropriate adhesive.

It will be noted that the diameter of the spool 12 is less than that of the spool 10 and further that its line receiving portion is cylindrical rather than dished since it will only need to hold a relatively small number of turns of line or leader.

The other modification necessary to practice of the present invention is the placement of the main spool 10 of a series of knobs 16 spaced at regular intervals around that surface of the spool 10 on which the spool 12 is mounted. These knobs have as their purpose, the prevention of line winding off the main spool when starting the windings on the upper duplex spool. Because of their location on the top side of the main spool, they do not interfere with the line when casting. Alternatively to the knob structure illustrated in the drawing, there could be small notches around the edges of the spool to serve the same purpose.

OPERATION

While it is believed that the foregoing description with relation to the attached drawing is adequate to teach those skilled in this art how to practice the present invention, it is never-the-less pointed out that presence of the auxiliary or duplex spool on the main spool will not prevent use of the reel in the conventional manner. Whenever a particularly accurate or particularly long cast is desired however, it is a simple matter to stop the retrieve somewhat short of the usual position and place the remaining line and/or leader manually on the surface of the duplex spool. Whenever a leader of any length is knotted to the line, a preferred method of operation is to position the knot joining the line and leader at the upper edge of the main spool and then wind a sufficient number of turns of the leader on the duplex spool to position the terminal tackle at the desired distance from the end of the rod tip for casting.

Variations of the above described invention will be apparent to those skilled in the art and applicant claims the benefit of a full range of equivalents within the scope of the appended claims.

I claim:

1. A spool structure for a conventional open face spinning reel comprising:
   a first main line storage spool and a second line storage spool on the axial outer face of the first in concentric abutting relation thereto, said spools each having a hub portion and a common rim therebetween, said common rim having a smooth uninterrupted circular peripheral surface, the other rim of said second spool being of less diameter than said common rim and the line capacity of said second spool being only a few turns; and
   means defining a plurality of equally circumferentially spaced knobs extending axially of said common rim adjacent the periphery thereof, the axial dimension of said knobs being less than the axial dimension of said spool.

2. A spool structure as defined by claim 1 wherein said conventional and second spools are integral.

* * * * *